UNITED STATES PATENT OFFICE.

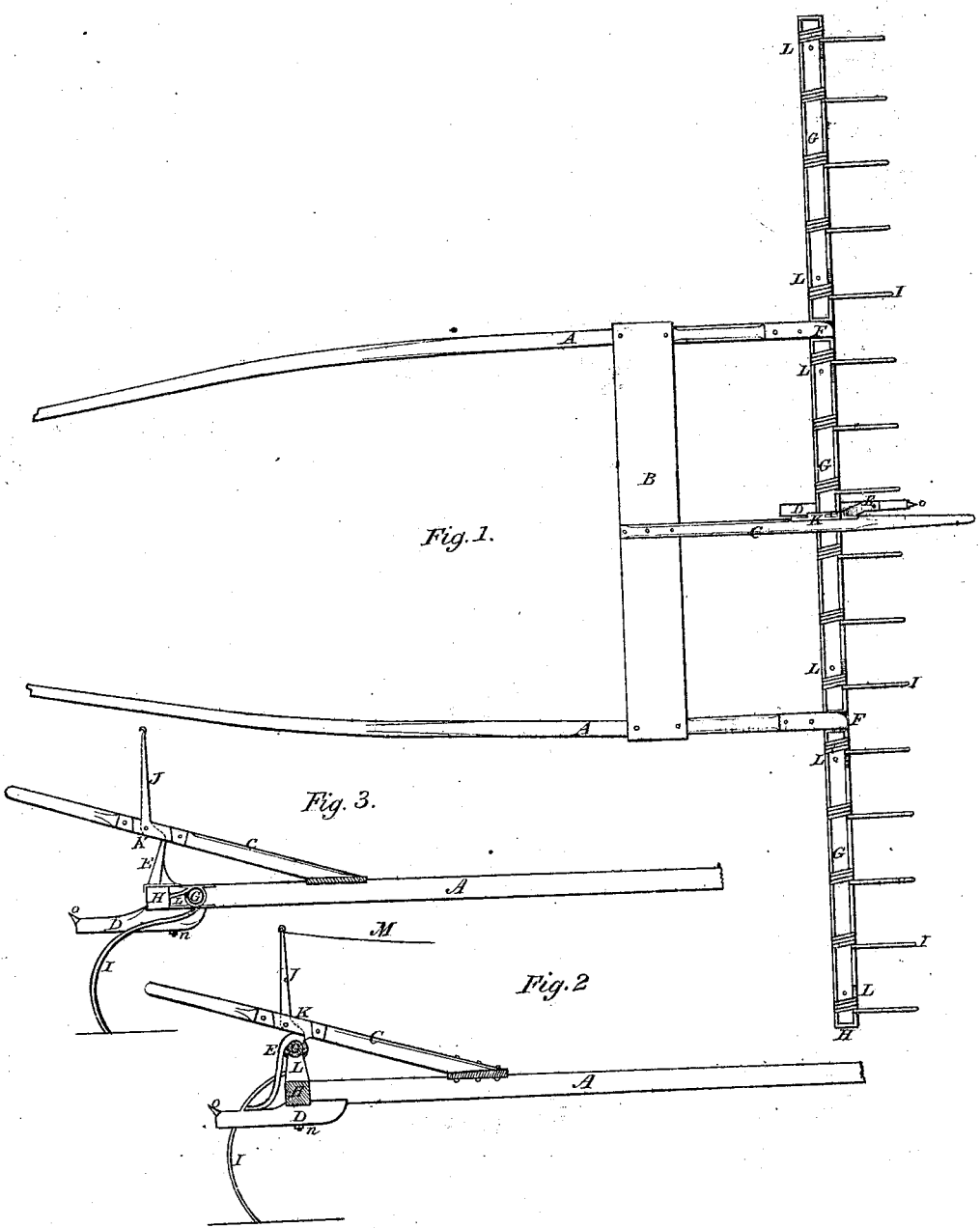

CHARLES R. SOULE, OF FAIRFIELD, VERMONT.

IMPROVEMENT IN HAY-RAKES.

Specification forming part of Letters Patent No. 8,961, dated May 18, 1852.

*To all whom it may concern:*

Be it known that I, CHARLES R. SOULE, of Fairfield, in the county of Franklin, and the State of Vermont, have invented certain new and useful Improvements on the Horse-Rakes; and I do hereby declare that the following is a full, clear, and exact description of the construction and operation of the same, reference being had to the annexed drawings, making part of this specification, in which—

Figure 1 is a plan or top view. Fig. 2 is a longitudinal and vertical section. Fig. 3 is a side elevation, showing a modification of Figs. 1 and 2.

When the same letters occur in the same or different figures they refer to the same or similar parts.

A, Fig. 1, &c., is the thills; B, cross-bar; C, piece attached to cross-bar. D is a piece attached to the head to assist in turning it; E, a projection or horn; F, straps of iron passing loosely around the main head and fastened to the thills; G, the second head, around which the teeth are coiled; H, the main head and revolving center; I, the teeth; J, the bent lever; K, the catch, &c.; L, blocks placed between the heads; M, the cord by which the lever is operated; $n$, nuts and bolts to secure the different parts firmly together. $o$ is an iron spur driven into the end of the piece D to catch into the ground and turn the rake.

The nature of my invention consists, first, in the arranging and combining of certain parts in such a manner as to place the revolving center nearer the lower ends of the teeth than could be done by having the rake revolve on the head around which the teeth are coiled, (which is the usual mode of constructing revolving spring-toothed rakes,) by which means I cause them to revolve much quicker and in going a much shorter distance than could otherwise be done, while at the same time they revolve much easier and more readily in consequence of having the second head, G, and coil, &c., to balance, or nearly so, the remaining heft of the teeth, &c., which will be on the other side of the center of revolution, or nearly so, thereby giving the required length and elasticity or play to the teeth with a quick and easy revolution; and, secondly, in the combining and arranging of certain parts, by means of which a small boy, while sitting on the horse, can operate the rake with great ease, causing it to revolve at pleasure, thereby avoiding the necessity of any other attendance.

To enable others skilled in the art to make and use my invention, I will proceed to describe its construction and operation.

The back ends of the thills A are cut out in a semicircular manner to fit to the head H, which is rounded where the thills are connected therewith, which connection I form by means of straps of iron passing loosely around the head H, so as to allow it to turn freely, and secured to the under and upper side of the thills by bolts. B, the cross-bar, is fastened to the thills at a sufficient distance from the head to allow the rake to revolve without interfering with it. The piece C is bolted to the cross-bar on or near its center and running back, with an inclination upward, so that the part directly over the main head H shall be about four and one-half or five inches above it.

K is a plate of iron fastened to the side of the piece C, with a projection on its under edge, forming a catch. On the inside of this plate is a recess, so that when it is fastened to the piece C it forms a kind of slot for the reception of the bent lever J, which works loosely on a pin passing through the plate and piece C, as shown in the drawings. Above the main head H is the second head, G, made round, and divided into three parts, as shown in Fig. 1, so as not to interfere with the thills A. Near each end of these pieces, between them and the main head, are placed blocks L, with bolts passing through them and the heads G and H, thus fastening the heads firmly together, while the blocks keep them a proper distance apart.

The teeth can be made of spring-wire about three-eighths inch diameter, one end passing through the main head, then running up and coiled two or three times around the head G, as seen in Fig. 1, then passing from the forward side of the head G down and back to the back side of H, thence downward, with an inclination or curve forward, to the ground, as shown in Fig. 2, the lower end hooking forward slightly.

To the under side of the head H is fastened a piece, D, projecting forward three or four inches and backward about eight or nine, to assist in turning the rake.

E, Fig. 2, is an iron made to strike the catch on the plate K, secured by a bolt passing through the heads G and H and the piece D, thus confining them all by the same bolt. The other end of this iron is turned down and fastened to the piece D, thereby forming also a brace to give additional strength or firmness.

I generally put six teeth between the thills and five on each end outside—sixteen in all—make the heads about nine feet long, the whole to be constructed of suitable and proper materials, of sufficient size, strength, and durability, as any one skilled in the art will readily understand.

In the modification, Fig. 3, the head H is placed above the body of the teeth, with the head G forward, E being a projection or horn with an elongated base running crosswise of the heads, and fastened by a bolt running down through the piece D; otherwise the arrangements are the same, or nearly so.

To understand more fully the operation of these rakes, suppose a person riding the horse holds in his hand one end of a cord, the other end being attached to the top of the bent lever J. When he wishes the rake to revolve he gives the cord a slight pull, causing the upper end of the lever to move forward, and consequently the lower end or short arm will move downward and throw the projecting iron attached to the head out from the catch, thereby allowing the rake to revolve as the horse moves forward. The projecting iron E, coming up, throws the lever J back to its place, strikes the catch, and is stopped by it, as before. These rakes revolve easily, and come into working position immediately on passing over the windrows, leaving them well and properly closed, while those constructed in the old method will leave several feet of unraked hay forward of each windrow to be closed in by hand or otherwise.

What I claim as my invention, and desire to secure by Letters Patent, is—

In so constructing revolving spring-tooth rakes as to bring the center of revolution nearer the lower ends of the teeth than can be done by having them revolve on the head around which the teeth are coiled, (which is the usual mode,) by which means I cause them to revolve much quicker and in going a much shorter distance than otherwise can be done, while at the same time they revolve much easier and more readily in consequence of having the second head, coil, &c., to balance, or nearly so, the remaining heft of the teeth, &c., which will be on the other side of the center of revolution, or nearly so, thereby giving the required length and elasticity to the teeth with a quick and easy revolution, which I accomplish as herein set forth, or by means analogous thereto.

CHARLES R. SOULE.

Witnesses:
 H. N. GILBERT,
 A. S. TAFT.